March 16, 1971 H. FLEISSNER 3,570,137
APPARATUS FOR THE CONTINUOUS TREATMENT OF WEB-SHAPED MATERIALS
Filed Dec. 19, 1968 2 Sheets-Sheet 1
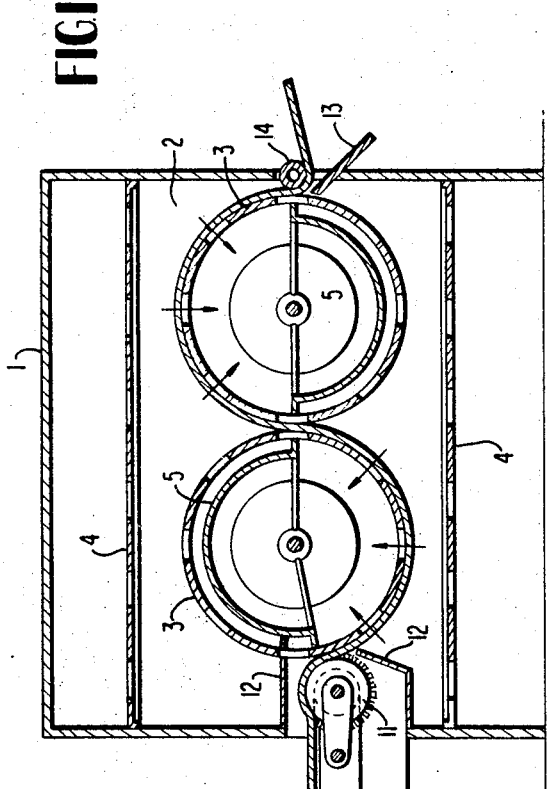
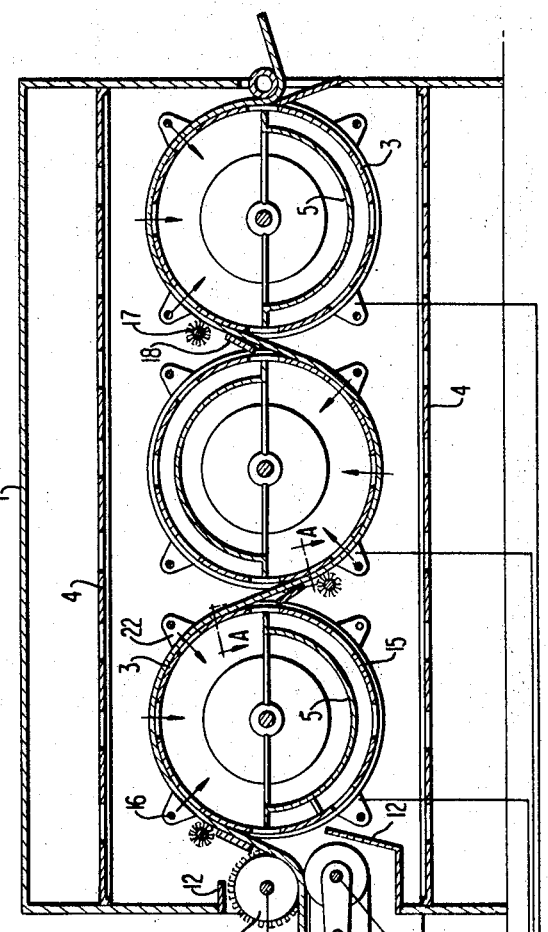
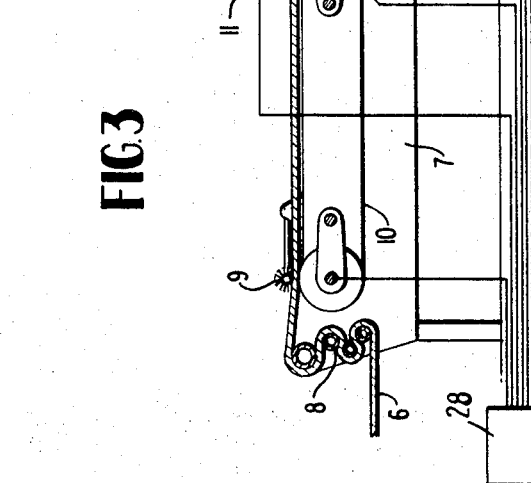
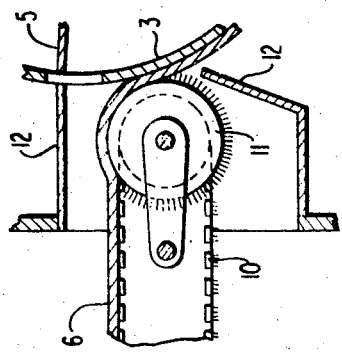
INVENTOR
HEINZ FLEISSNER
BY *Craig & Antonelli*
ATTORNEYS

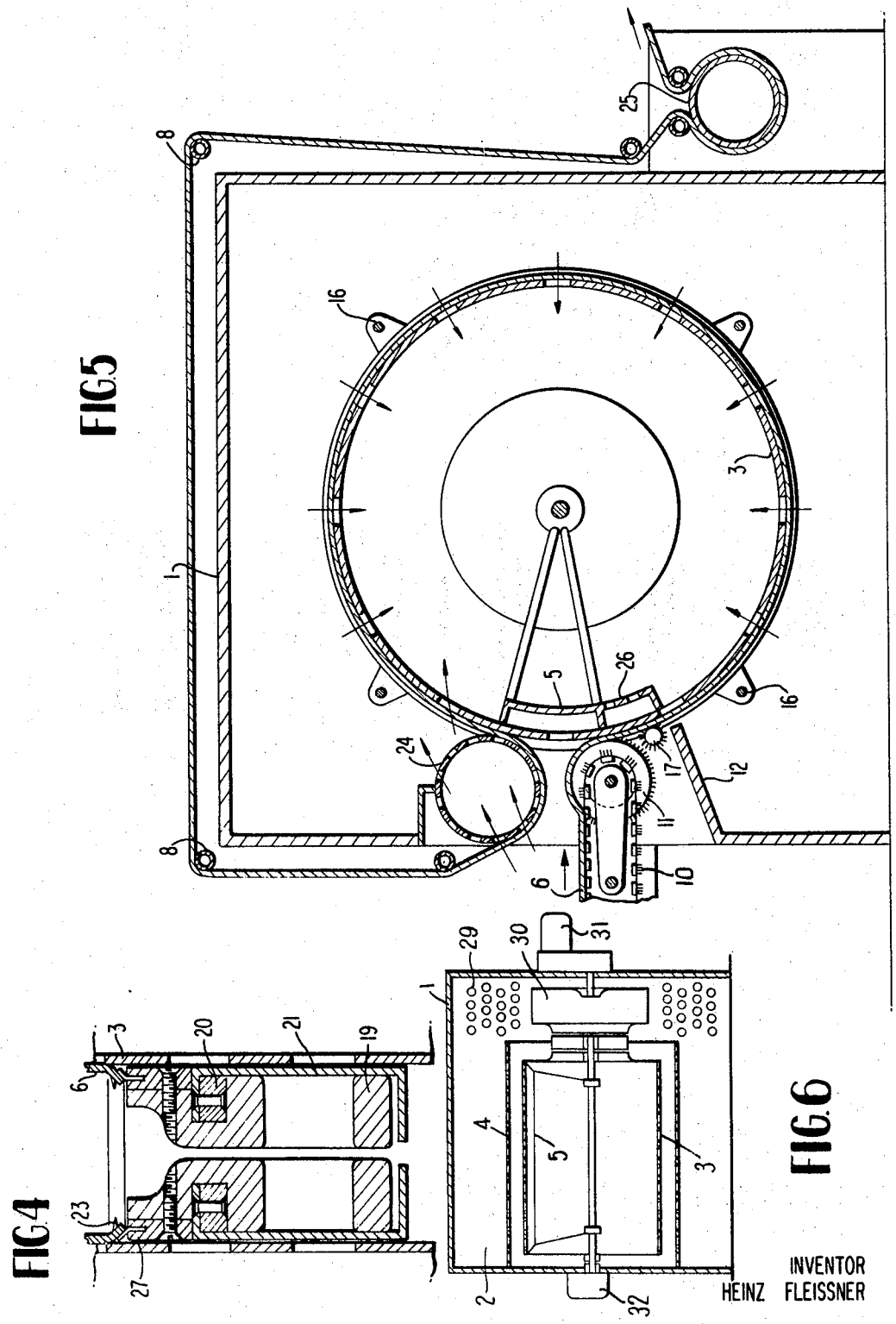

United States Patent Office
3,570,137
Patented Mar. 16, 1971

3,570,137
APPARATUS FOR THE CONTINUOUS TREATMENT OF WEB-SHAPED MATERIALS
Heinz Fleissner, Egelsbach, near Frankfurt am Main, Germany, assignor to Vepa AG
Filed Dec. 19, 1968, Ser. No. 785,263
Claims priority, application Germany, Dec. 19, 1967, P 16 35 358.5
Int. Cl. F26b *11/02*
U.S. Cl. 34—115                     24 Claims

ABSTRACT OF THE DISCLOSURE

The present disclosure is directed to an apparatus for the continuous treatment of web-shaped materials which comprises a heat-insulated treatment housing, at least one perforated conveying means rotatably disposed within said housing, fan means provided in said housing for subjecting said conveying means to a suction draft and for circulating the treatment medium, heating means provided in the circulation of the treatment medium, inlet means for introducing the material to be treated to the housing, said inlet means comprising a tensioning zone at least partially disposed outside of the housing, needle disc means provided between the tensioning zone and the conveying means for transferring the material being treated from the tensioning zone to the conveying means and outlet means for removing the material being treated from the treatment housing.

BACKGROUND OF THE INVENTION

The present invention relates to an apparatus for the continuous treatment of web-shaped materials, particularly textile materials, utilizing a tensioning zone containing conveying means provided with needle chains, a heat-insulated housing containing at least one perforated drum as the conveying element, and one or more fan means for producing a suction draft and for circulating the treatment medium. Heating units are also provided in the heat-insulated treatment housing for heating the treatment medium. The tensioning zone is arranged at least partially outside of the treatment housing and functions as the inlet and feeding means for the apparatus.

It has been suggested to combine a tensioning zone with a device which employs the conveying elements sieve screens subjected to a suction draft, preferably perforated drum means. The use of the through flow principle and the conveyance of the material being treated on the surface of perforated sieve means during the treatment affords considerable advantages when compared to a treatment conducted only on tensioning or stretching frames (tenters). Advantages in using the process employing the through flow principle and the placement of the material on perforated surfaces, for example sieve drum means, include extremely short treatment times and a very uniform treatment effect. Since the material is conveyed on a screen-type surface, for example a sieve drum, during the treatment, a more uniform appearance of the material can be obtained, particularly in connection with fixation treatments and also in connection with stitched goods. By the utilization of a tensioning zone, the material being treated can be pre-stretched to a certain width, spin folds (creases incurred during centrifuging) can be pulled out, and by steaming the material in the tensioning zone, for example, a satisfactory shrinking of the material can be obtained. However, in the above-identified apparatus, difficulties are encountered in feeding or transferring the material being treated from the tensioning zone to the perforated drum or to the screen-surface conveying means subjected to a suction draft.

SUMMARY OF THE INVENTION

An object of the present invention is to avoid the prior disadvantages in the continuous treatment of web-shaped materials, particularly textile materials.

Another object of the present invention is to provide an improved apparatus for the continuous treatment of textile materials wherein effective means are utilized for transferring the material being treated from the tensioning zone to the perforated conveying element.

Other objects in further scope of applicability of the present invention will become apparent from the detail description given hereinafter. It should be understood, however, that the detailed description and specific examples, while indicating further embodiments of the invention, are given by way of illustration only, since various changes and modifications within the spirit and scope of the invention will become apparent to those skilled in the art from this detailed description.

Pursuant to the present invention, it has been found that the above-mentioned disadvantages may be eliminated and in a much improved apparatus for continuously treating web-shaped materials, especially textile materials, may be obtained by arranging between the tensioning zone and the subsequent conveying means, for example, sieve drum means, needle discs as the transferring element and/or by providing needle-studded rings around the perforated conveying means. The needle discs can be disposed beneath or above the material being treated and can engage the material with their needles either from below or above said material depending upon the desired arrangement. Since the apparatus of the present invention is intended for processing materials with different widths, and different stretching values, it is proposed to adjust the needle discs together with the tensioning zone, that is, to couple these components with the adjusting mechanism of the tensioning chains.

When processing textile materials which exhibit a high degree of shrinking, and also when processing very heavy materials, such as for example heavy woven goods and tufted carpets, the suction draft of the perforated drum may be insufficient for holding the material to the conveying means, and thus the material being treated may incur a certain amount of shrinkage during the treatment process. It has already been suggested to overstretch the material to the extent of the anticipated shrinkage. However, overstretching the material does not produce the desired effect in all of the material being treated. Thus, when different strong shrinking forces occur, the web of material exhibits different widths. In order to eliminate this undesirable phenomenon, it is suggested according to the present invention to arrange rings with needles around the perforated drums. It is advantageous to mount the needle rings on spindles in an adjustable fashion. In this embodiment, it is suitable to provide a common control device for the tensioning zone, the needle discs and the needle rings, so that they can be adjusted together by way of servomotors from the control switchboard. For the purpose of transferring the material between the needle discs and the perforated drums, between the needle discs and the needle rings of the perforated drums and for the transfer of said material on to needles of an adjacent perforated drum, it is advantageous to provide stripper plates and/or brush rollers at the periphery of the perforated drums. The stripper plates and brush rollers provide effective means for transferring the material being treated from one perforated drum means to an adjacent perforated drum means.

In many cases, it is advantageous to combine the tensioning zone with only one sieve drum means provided with needle rings, and to select the diameter of the drum in accordance with the efficiency desired. When using this drum, the material being treated is conveyed on substantially the entire surface of said drum and accordingly the inlet and outlet for the material being treated are positioned on the same side of the treatment chamber.

BRIEF DESCRIPTION OF THE DRAWINGS

The present invention will become more fully understood from the detailed description given here and below and the accompanying drawings which are given by way of illustration only and thus are not limitative with the present invention and wherein, FIG. 1 shows a longitudinal sectional view of the aparaptus of the present invention, FIG. 2 shows in greater detail the transfer point from the tensioning zone to the perforated drum in accordance with FIG. 1, FIG. 3 shows a longitudinal sectional view of another embodiment of the apparatus of the present invention.

FIG. 4 illustrates a section taken along A—A at the transfer point between two perforated drums as shown in FIG. 3, FIG. 5 shows a longitudinal sectional view of another embodiment of the apparatus of the present invention, and FIG. 6 shows a side view of the treatment housing and sieve drum means as shown in FIG. 1.

DESCRIPTION OF THE PREFERRED EMBODIMENTS

Referring now to the drawings wherein like reference numerals are used throughout the various views to designate like parts, the apparatus of the present invention comprises a housing subdivided by a partition, not shown, into a treatment chamber 2 with perforated sieve drums 3 subjected to a suction draft and a fan chamber, not shown, with fan means, also not shown. In this connection, the fan means are associated with the front face of the perforated drums 3 and draw the treatment medium out of the front face of the perforated drums and recycle this medium by way of the heating elements disposed in the fan chamber, into the treatment chamber 2. In order to render a uniform flow of the treatment medium, screen covers are provided in the perforated drums 3 on that side of the sieve drum which are not covered with the material being treated. The baffle plates prevent the suction draft on this side of the sieve drum, so that the treatment medium is drawn into said drums through the materials 6 being treated. In front of the housing 1, a tensioning zone 7 is located, said zone containing guide rolls 8 and a needle-feeding device 9 associated with tensioning means, that is, a conveyor belt which contains needle chains 10. From these chains, the material 6 is lifted by means of needle discs 11 and transferred to the first sieve drum 3. In order to avoid the loss of the hot treatment medium, shielding plates 12 are extended into the treatment housing and in close proximity to the sieve drums. By the arrangement of the baffle plates 5 in the sieve drums, the material being treated is automatically passed from one sieve drum to the next sieve drum, and said material is withdrawn from the treatment housing by a chute 13 and a roll 14.

The device of FIG. 3 is of similar construction as the device of FIG. 1. In FIG. 3, needle rings 15 are disposed around the perforated sieve drums, additionally holding the material with respect to its width. The needle rings are adjustably mounted by way of spindles 16. Brush rollers 17 and/or stripper plates 18 are provided for transferring the material 6 from the needles of one sieve drum means to the needles of an adjacent sieve drum means. A common control device 28 can be provided for the tensioning zone, the needle discs and the needle rings, so that they can be adjusted together by way of servo motors from a control switchboard.

The structure of the needle rings 15 can be readily seen from FIG. 4. These needle rings consist of an annular body 19 directly associated with the perforated drum 3 and rotatable therewith. The annular body slides on a stationary annular part 21 utilizing an annular friction bearing 20. This stationary annular element 21 is connected with the spindle 16 via fishplates 22. On the side facing the material being treated, needle strips 27 with needles 23 projecting at the front face are threadedly attached to the annular body 19. Due to this arrangement of the needles 23, the material 6 is maintained in close contact with the sieve drum 3 also at the needle-fastened rims.

The apparatus of FIG. 5 is provided with only one perforated sieve drum 3 which is substantially, completely enveloped by the material being treated. The inlet and outlet to the treatment housing are provided on the same side of said housing. At the outlet, a perforated roll 24 is provided for guiding purposes. By means of the suction draft of the perforated sieve drum 3, cold, ambient air is drawn through this roll, and the material is simultaneously cooled thereby. The material is thereafter conducted via guide rollers 8 over the device and, if necessary, passed to a chill roll 25. In order to obtain an introduction of fresh air through the perforated roll 24, a perforated plate 26 is additionally disposed next to the baffle plate 5, said perforated plate, depending upon the free cross sectional area thereof, permitting only a reduced suction draft in said area which is just strong enough to take the material off the needle discs 11 and draw it against the perforated drum 3. By means of the brush roll 17, the material is then pressed into the needles of the needle rings of the perforated drum 3.

FIG. 6 shows a side view of the treatment housing and sieve drum as illustrated in FIG. 1. In FIG. 6, the heating means 29 are disposed in the fan chamber above and below the fan means 30. A drive 31 is associated with the fan means and a drive 32 is provided for rotating the sieve drum means.

The invention being thus described, it will be obvious that the same will be varied in many ways. Such variations are not to be regarded as a departure from the spirit and scope of the invention, and all such modifications as will be apparent to one skilled in the art are intended to be included.

It is claimed:

1. An apparatus for the continuous treatment of web-shaped materials which comprises a heat-insulated treatment housing, at least one perforated conveying means rotatably disposed within said housing, fan means provided in said housing for subjecting said conveying means to a suction draft and for circulating the treatment medium, heating means provided in the circulation of the treatment medium, inlet means comprising a tensioning zone containing tensioning means disposed outside of the housing, needle disc means provided in a transfer zone at or near the end portion of the tensioning means for transferring the material being treated from the tensioning means to the conveying means and outlet means for removing the material being treated from the treatment housing.

2. The apparatus of claim 1 wherein the needle disc is disposed beneath the material and engages the material from below.

3. The apparatus of claim 1 wherein the needle disc is disposed above the material and engages the material from above.

4. The apparatus of claim 1, wherein the tensioning zone comprises a plurality of guide rolls, a conveyor belt provided with needle chains as the tensioning means and associated with the tensioning means and the material being conveyed thereon.

5. The apparatus of claim 1 wherein shielding plates are provided inside the treatment housing at the inlet thereof to prevent loss of the treatment medium.

6. The apparatus of claim 1 wherein needle rings are disposed around the perforated conveying means.

7. The apparatus of claim 6 wherein the needle rings are adjustably mounted by spindle means.

8. The apparatus of claim 1 wherein more than one conveying means is utilized and brush roller means are provided at the periphery of the conveying means to assist in transferring the material from the needles of one conveying means to another conveying means.

9. The apparatus of claim 8 wherein stripper plates are provided at the periphery of the conveying means and cooperate with the brush roller means in transferring the material from one conveying means to another.

10. The apparatus of claim 7 wherein the needle rings comprise an annular body directly associated with the perforated conveying means, said annular body being provided with an annular fricton bearng dsposed on a stationary annular element which is connected with the spindle means.

11. The apparatus of claim 10 wherein on the side facing the material being treated needle strips containing needles projecting at the front face thereof are threadedly attached to the annular body, thereby maintaining the material being treated in close contact with the conveying means.

12. The apparatus of claim 6 containing only one perforated conveying means subjected to a suction draft wherein the outlet means is disposed above the needle disc means at the inlet of the treatment chamber thereby providing substantially complete contact of the material being treated with the conveying surfaces said outlet means comprising a perforated roller.

13. The apparatus of claim 12 wherein after leaving the treatment chamber the material being treated is conveyed on the surface of a chill roller.

14. The apparatus of claim 12 wherein a perforated baffle plate is provided on the inside of the perforated conveying means at the inlet of the treatment housing to facilitate the removal of the material being treated from the needle disc to the conveying means.

15. An apparatus for the continuous treatment of textile materials which comprises a heat-insulated treatment housing, at least one sieve drum means subjected to a suction draft rotatably disposed within said housing, fan means provided in said housing for subjecting said sieve drum means to a suction draft and for circulating the treatment medium, heating means provided in the circulation of the treatment medium, inlet means for introducing the material to be treated to the housing, said inlet means comprising a tensioning zone at least partially disposed outside of the housing, needle disc means provided in a transfer zone at or near the end portion of the tensioning zone for transferring the material being treated from the tensioning zone to the sieve drum means, needle rings disposed around the sieve drum means and outlet means for removing the material from the treatment chamber.

16. The apparatus of claim 15 wherein the needle disc are adjustable together with the tensioning zone.

17. The apparatus of claim 15 wherein more than one sieve drum means is utilized and brush roller means and stripping means are provided at the periphery of the sieve drum means between the needle disc and the sieve drum metans and between the needle rings of adjacent sieve drum means.

18. The apparatus of claim 15 wherein the tensioning zone, the needle disc and the needle rings disposed underneath the sieve drum means is commonly adjusted by a control unit.

19. The apparatus of claim 15 wherein, in the tensioning zone the material being treated is conveyed on a plurality of guide rolls and a conveyor belt provided with needle chains.

20. The apparatus of claim 19 wherein said needle-feeding means is disposed above the conveyor belt and facilitates the feeding of the material being treated thereto.

21. The apparatus of claim 19 wherein the said needle disc means is disposed above the conveyor belt at the inlet of the treatment chamber to facilitate transferring the material from said conveyor belt to the sieve drum means.

22. The apparatus of claim 1, wherein the perforated conveying means is a sieve drum means subjected to a suction draft.

23. An apparatus for the continuous treatment of web-shaped materials which comprises a heat-insulated treatment housing, at least one sieve drum means rotatably disposed within said housing, drive means for rotating said sieve drum means, fan means provided in said housing for subjecting said conveying means to a suction draft and for circulating the treatment medium, fan drive means associated with said fan means, heating means provided in the circulation zone of the treatment medium, inlet means comprising tensioning means extending into the treatment housing, needle disc means provided in a transfere zone at or near the end portion of the tensioning means for transferring the material being treated from the tensioning means to the sieve drum means while maintaining the shape of the material constant, shielding plates provided inside the treatment housing above and below the tensioning means and needle disc means and tensioning means and needle disc means and extending in close proximity to the conveying surface of the sieve drum means and outlet means for removing the material being treated from the treatment housing.

24. The apparatus of claim 1 wherein the needle disc means is disposed in a transfer zone between the end portion of the tensioning means and the conveyor means.

References Cited

UNITED STATES PATENTS

| | | | |
|---|---|---|---|
| 2,996,808 | 8/1961 | Fleissner | 34—115X |
| 3,021,607 | 2/1962 | Fleissner | 34—115 |
| 3,256,580 | 6/1966 | Vorderbrugge | 26—58X |
| 2,804,693 | 9/1957 | Brodie | 34—120 |
| 3,447,247 | 6/1969 | Daane | 34—122 |
| 3,354,035 | 11/1967 | Gottwald et al. | 34—111 |

MARTIN P. SCHWADRON, Primary Examiner

T. W. STREULE, Assistant Examiner

U.S. Cl. X.R.

34—122